United States Patent [19]

Holcomb

[11] 3,710,091
[45] Jan. 9, 1973

[54] FIBER OPTIC ILLUMINATOR APPARATUS FOR SCIENTIFIC INSTRUMENTS

[76] Inventor: John M. Holcomb, 6649 Sesame Lane, Tucson, Ariz. 85704

[22] Filed: Jan. 27, 1971

[21] Appl. No.: 110,121

[52] U.S. Cl. ..............................240/2 MA, 240/1 EL
[51] Int. Cl. ...............................................G02b 21/06
[58] Field of Search..........................240/1 EL, 2 MA

[56] References Cited

UNITED STATES PATENTS

| | | | |
|---|---|---|---|
| 2,471,879 | 5/1949 | Lowber | 240/2 MA |
| 3,278,738 | 10/1966 | Clark | 240/1 EL |
| 2,727,435 | 12/1955 | Ferrari, Sr. | 240/2 MA |

FOREIGN PATENTS OR APPLICATIONS

| 638,404 | 6/1950 | Great Britain | 240/1 EL |
|---|---|---|---|

*Primary Examiner*—S. Clement Swisher
*Attorney*—Drummond & Phillips

[57] ABSTRACT

In order to selectively illuminate scientific instruments, such as the field of view of a high grade microscope, with light having predetermined characteristics, an adapter is provided for coupling a conventional lamphouse to a fiber optic bundle which terminates, at it remote end, at the area to be illuminated. The adapter is provided with fittings to mate with lamphouse and contains a collector lens or lens group to concentrate and collimate light from the lamphouse onto the transmitting end of the fiber bundle. The adapter is generally cylindrical in shape and, intermediate along its length, a circumferential segment is cut away to receive one or more filters to condition the light issued from the lamphouse according to the illumination requirements. The characteristics of the light transmitted through the fiber bundle may further be controlled by selecting the lamp utilized in the lamphouse. In variant configurations, the adapter incorporates a right angle prism at its outer end to permit the fiber bundle to be directed radially outwardly from the adapter to minimize the extent of the adapter from the lamphouse, which extent may be a critical factor where the lamphouse is installed permanently near a wall or other object with which the adapter might otherwise physically interfere. A conventional shutter mechanism is incorporated into another variant of the adapter for providing the capability of controlled transient illumination to the scientific instrument receiving light from the fiber bundle.

2 Claims, 5 Drawing Figures

PATENTED JAN 9 1973

INVENTOR.
JOHN M. HOLCOMB
BY
Drummond & Phillips
ATTORNEYS

PATENTED JAN 9 1973

INVENTOR
JOHN M. HOLCOMB
BY
Drummond & Phillips
ATTORNEYS

FIBER OPTIC ILLUMINATOR APPARATUS FOR SCIENTIFIC INSTRUMENTS

This invention relates to the scientific instrument arts, and, more particularly, to adapter apparatus for directing and conditioning light from a lamphouse to an area to be illuminated.

Certain high grade scientific instruments, such as microscopes, Watson Interference Objectives, and the like, require the concentration of closely controlled and conditioned light in predetermined areas. One prior art method of providing such light has been to utilize a lamphouse, such as the well known Zeiss lamphouse, coupled through suitable adapter apparatus directly to the scientific instrument. A lamphouse permits the selection of any one or a number of different lamps such that the source spectrum and intensity can be selected for a particular application. However, both the lamphouse itself and the adapter for coupling it to the scientific instrument are large and cumbersome and also can bring about the transfer of an undesirable amount of heat to the scientific instrument. It has been proposed to utilize a distinctly separate light source in conjunction with a fiber optic bundle to concentrate light from the remote source to the scientific instrument as necessary. The known prior art apparatus utilizing fiber optic bundles can accommodate only a very limited variety of lamps and have no provision for conditioning light from the source before it is directed onto the source end of the fiber bundle. Thus, it becomes readily apparent that it would be highly desirable to be able to use a lamphouse as a remote light source in order to enjoy the benefit of interchangeable lamps in combination with the use of fiber optics, provided light from the lamphouse can be further conditioned and controlled to meet the needs of the scientific instrument to which the apparatus is coupled. A further desirable benefit arising from the provision of such apparatus flows from the utilization in conventional lamphouses, such as the Zeiss Lamphouse, of two separate ports through which light from the source within may issue. If the lamphouse is semipermanently coupled to one scientific instrument, apparatus according to the invention may be coupled to the second port such that two separate scientific instruments may be illuminated from the single lamphouse.

It is therefore a broad object of my invention to provide improved apparatus for illuminating scientific instruments.

It is another object of my invention to provide such apparatus which includes means for controlling the spectrum and intensity and otherwise conditioning the applied light for a specific application.

It is a more specific object of this invention to provide apparatus for coupling and conditioning light from a conventional lamphouse to a scientific instrument.

A still further specific object of this invention is to provide such apparatus which includes a fiber optic bundle for transmitting the light from adapter apparatus to the scientific instrument.

In another aspect, another object of my invention is to provide adapter apparatus which is compact and may be incorporated into existing lamphouse installations.

The subject matter of the invention is particularly pointed out and distinctly claimed in the concluding portion of the specification. The invention, however, both as to organization and method of operation, may best be understood by reference to the following description taken in connection with the accompanying drawing of which:

Figure 1:
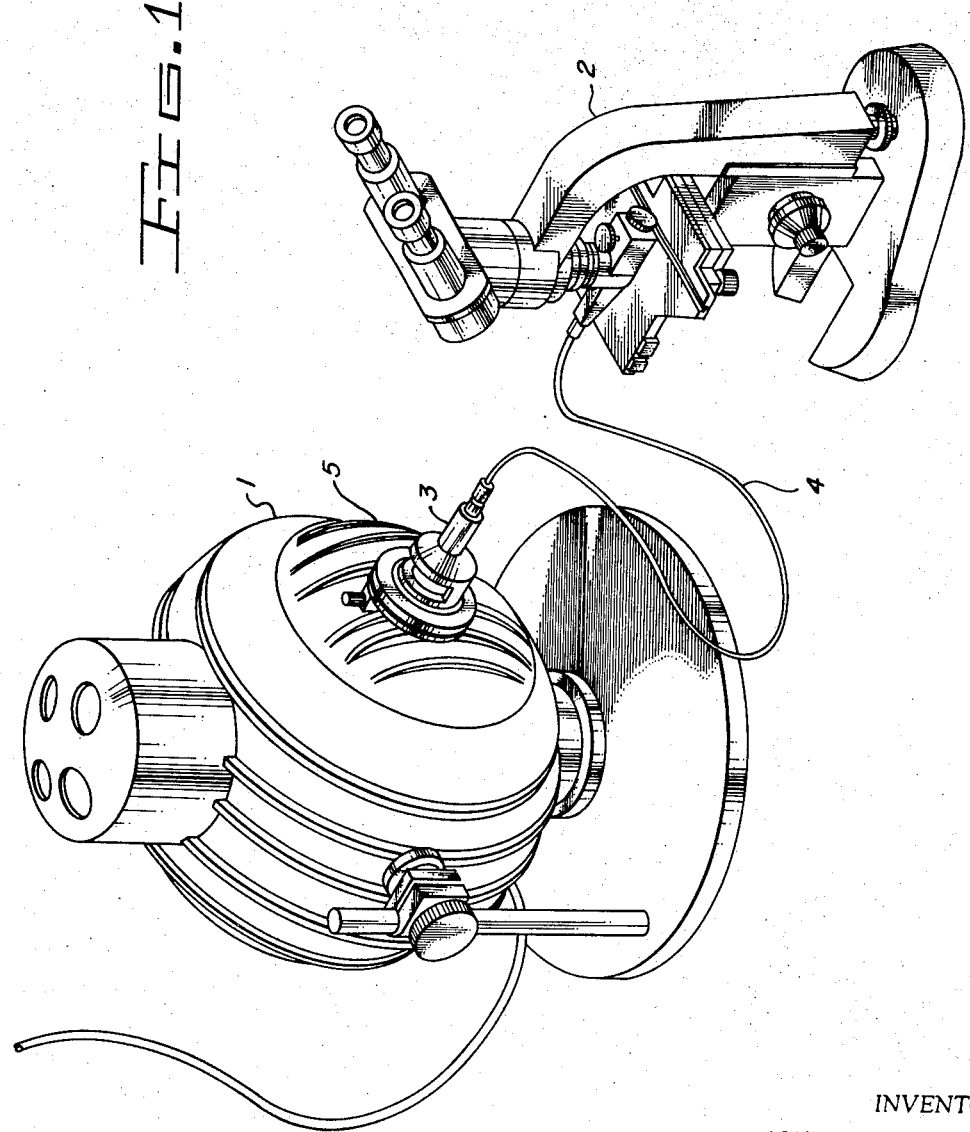
FIG. 1 is a perspective view illustrating the use of the apparatus of the present invention for coupling a conventional lamphouse to a high grade microscope for illumination of the microscope field of view.

Referring to FIG. 1, it will be observed that a conventional lamphouse 1 is coupled to a high grade microscope 2 by an adapter according to the present invention which includes an adapter housing 3 and a fiber optic bundle 4. The lamphouse 1 illustrated in FIG. 1 will be recognized by those skilled in the art as the type manufactured by Zeiss. The lamphouse 1 is conventionally adapted to receive many different types of lamps and to accommodate the necessary variety of sockets such that quartz-iodine lamps, mercury lamps, metal-halide lamps, xenon lamps, sodium spectral lamps, and other lamps can all be utilized within the lamphouse 1 as a light source with predetermined characteristics. The lamphouse 1 has two diametrically opposed ports. The adapter housing 3 is mounted onto one port 5 while the other port is not within view in the perspective view of FIG. 1. In a standard variation, the lamphouse 1 may be fitted with a parabolic mirror in one or the ports to provide a more intense concentration of light on the opposite port. For further information concerning these conventional lamphouses, one may refer to the Carl Zeiss publication "Microscope Illuminators, Lamps and Lamp Sockets."

Figure 2:
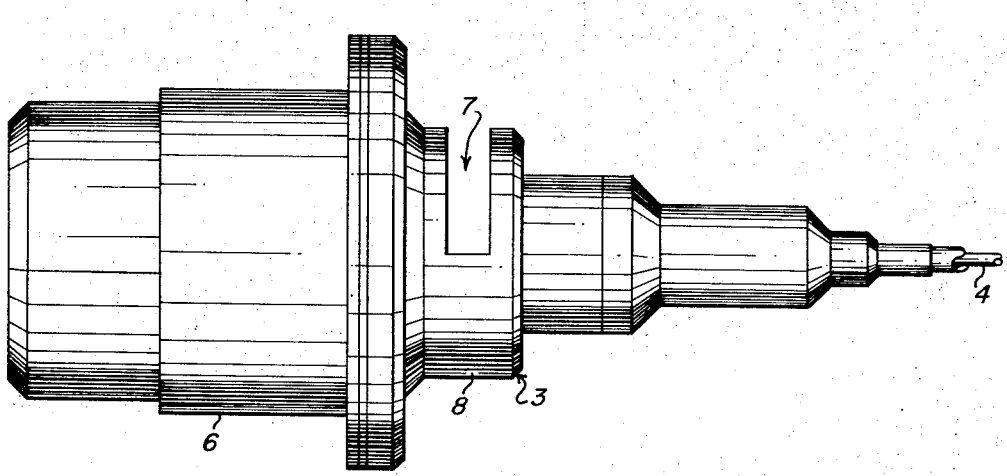
FIG. 2 is a side view of a first preferred embodiment of the present invention.

FIG. 2 illustrates the adapter housing 3 in more detail than in FIG. 1. The adapter housing 3 includes a collector assembly 6 for directing light from the source within the lamphouse to a concentrating lens (not shown in FIG. 2) such that a converging beam passes longitudinally through the adapter housing 3 to impinge upon the end of the fiber bundle 4 mounted at its outer end. A circumferential segment 7 is cut away around approximately one-half the circumference of a filter housing section 8 of the adapter housing 3. As will become more apparent as the description proceeds, the circumferential segment is dimensioned to receive standard filters for conditioning the collimated beam of light if such conditioning is necessary to perform the illuminating function at hand.

Figure 3:
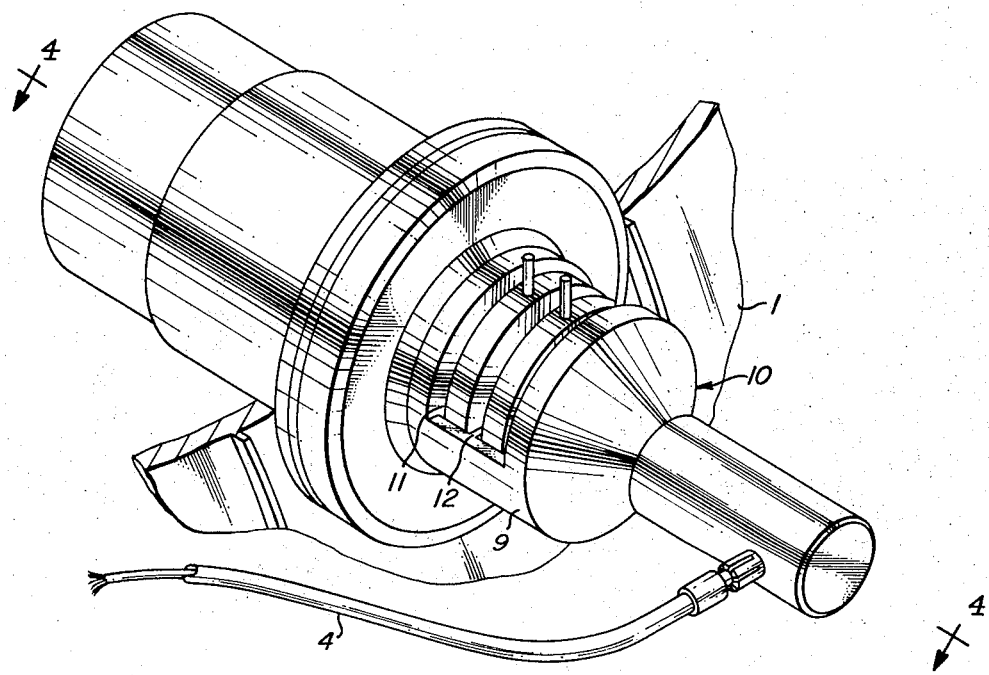
FIG. 3 is a perspective view of a second preferred embodiment of the invention in which provision is made for taking off conditioned light radially rather than longitudinally.
Figure 4:
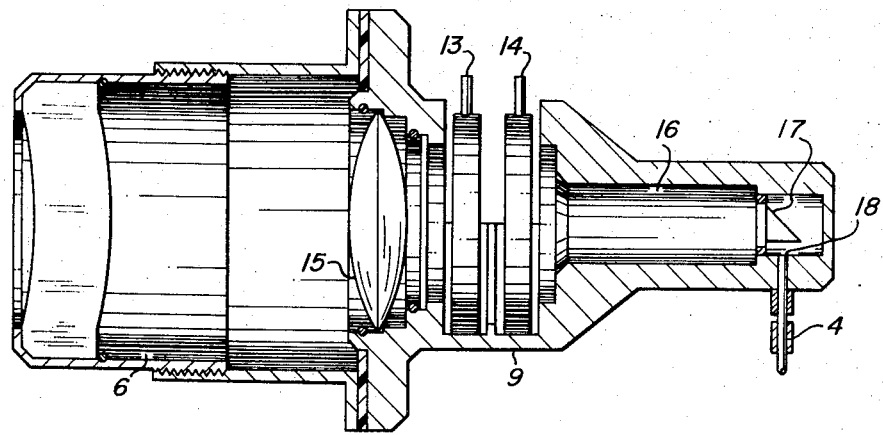
FIG. 4 is a cross-sectional view along the line 4—4 of FIG. 3.

Attention is now directed to FIGS. 3 and 4 which illustrate a variant embodiment of the invention and reveal additional interior detail common to the several embodiments. It will be observed from FIG. 3 that a filter housing section 9 of the adapter housing 10 is provided with a somewhat wider circumferential segment 11, which includes an annular partition 12 extending around the uncutaway portion of the filter housing section 9 to house a pair of serially disposed filters 13 and 14, thereby providing the capability for more refined conditioning of the collimated beam of light passing therethrough. For example, the filter 13 may be a neutral density filter which functions only to decrease the beam intensity without affecting its spectrum while the filter 14 may be utilized to suppress a predetermined band from the beam.

The cross-sectional view of FIG. 4 reveals the collector assembly 6 and a converging lens 15 with a focal length sufficient to permit the insertion of the number of filters provided for and also a shutter that will be considered below. After passing through the filter housing section, the beam enters another lens system 16 which functions to collimate the light from the converging beam of the lens 15. The lens system 16 may be a microscope objective and is selected to provide collimated (or as near collimated as possible in view of the non-point source) from its front aperture. After the collimated beam of light issues from the front aperture of the lens system 16, it enters a 90° prism 17 which redirects the collimated beam at right angles such that it falls directly on one end 18 of the fiber bundle 4 to be conveyed therethrough to the scientific instrument to be illuminated.

Figure 5:
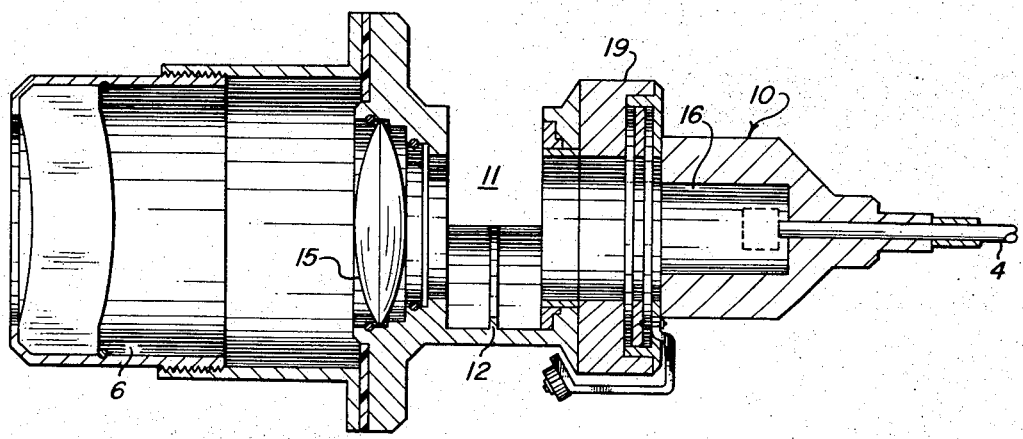
FIG. 5 is a cross-sectional view illustrating a third preferred embodiment of the invention.

The utilization of the prism 17 permits the fiber bundle 4 to be directed radially outwardly rather than longitudinally as illustrated in the variant configurations of FIGS. 1, 2, and 5. As previously indicated, the lamphouse 1 in a practical environment may be secured semipermanently in place with one of its ports coupled directly to another scientific instrument. Such installations may leave the lamphouse rather close to a wall or other obstruction such that the somewhat shorter adapter body made possible by the utilization of the prism 17 permits the use of the second port where it would otherwise be physically impossible.

FIG. 5 illustrates another variant of the invention which, in addition to providing for the insertion of a plurality of filters in the circumferential segment 11, also utilizes a shutter mechanism 19 disposed between the filter area and the objective lens system 16 for providing distinct control over the period of illumination when a short exposure is required. By way of example, the shutter mechanism 19 may be the type marketed under the tradename Prontor Magnetic with which the desired close control has been achieved in practice. It will be noted, in FIG. 5, that the fiber bundle 4 extends longitudinally from the adapter housing 10 in the same manner as the adapters illustrated in FIGS. 1 and 2. The beam of light collimated by the objective lens system 16 simply continues longitudinally to impinge on the terminal of the fiber bundle as opposed to being redirected at a 90° angle by a prism. Thus, this construction is simpler than that illustrated in FIGS. 3 and 4 but requires somewhat more free area outward from the lamphouse to which the adapter is coupled.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. An illuminator adapter for coupling light emitted from a lamphouse port to a scientific instrument by means of a fiber optic bundle comprising: a generally cylindrical adapter housing, said adapter housing having a first end dimensioned and configured to fit into said port in light receiving relationship with respect to a light source within said lamphouse, said adapter housing further including, in serial disposition, a first section containing a converging lens, a second section comprising a cylindrical section cutaway about the upper half of its circumference for supporting at least one light filter, a third section supporting a compressing optical system for accepting the converging beam from said converging lens and a fourth section supporting one end of said fiber optic bundle, said converging lens and said compressing optical system being concentrically disposed within said adapter housing for respectively concentrating and collimating light from said source, said second section being disposed between said converging lens and said compressing optical system for selectively receiving at least one filter to condition the light passing therebetween, said one end of said fiber optic bundle being in light receiving relationship with respect to light collimated by said compressing optical system; and shutter apparatus disposed between said second section and said third section for selectively controlling the period during which light is transmitted through said fiber bundle.

2. An illuminator according to claim 1 in which apparatus for effecting a 90° reflection of the collimated beam issuing from said compressing optical system is disposed in the beam path between said compressing optical system and said one end of said fiber optic bundle such that the collimated beam is directed radially outwardly from said adapter through said fiber bundle.

* * * * *